US008467050B2

(12) United States Patent
Dutel (10) Patent No.: US 8,467,050 B2
(45) Date of Patent: Jun. 18, 2013

(54) APPARATUS AND METHOD FOR METERING FLARE GAS

(75) Inventor: Lewis J. Dutel, Cypress, TX (US)

(73) Assignee: M-I LLC, Houston, TX (US)

( * ) Notice: Subject to any disclaimer, the term of this patent is extended or adjusted under 35 U.S.C. 154(b) by 441 days.

(21) Appl. No.: 12/786,925

(22) Filed: May 25, 2010

(65) Prior Publication Data

US 2010/0313674 A1 Dec. 16, 2010

Related U.S. Application Data

(60) Provisional application No. 61/186,313, filed on Jun. 11, 2009.

(51) Int. Cl.
*G01N 1/10* (2006.01)
*G01N 21/00* (2006.01)
*E21B 47/00* (2006.01)

(52) U.S. Cl.
USPC ........................ 356/246; 356/338; 166/250.01

(58) Field of Classification Search
None
See application file for complete search history.

(56) References Cited

U.S. PATENT DOCUMENTS

| 4,177,676 | A | 12/1979 | Welker |
| 5,199,509 | A | 4/1993 | Wright et al. |
| 6,000,290 | A | 12/1999 | Benton et al. |
| 6,401,538 | B1 | 6/2002 | Han et al. |
| 6,470,732 | B1 | 10/2002 | Breton |
| 6,575,048 | B1 | 6/2003 | Tow |
| 6,585,044 | B2 | 7/2003 | Rester et al. |
| 6,817,229 | B2 | 11/2004 | Han et al. |
| 6,829,947 | B2 | 12/2004 | Han et al. |
| 6,938,458 | B2 | 9/2005 | Han et al. |
| 7,111,982 | B1 | 9/2006 | Swonger et al. |
| 7,265,832 | B2 | 9/2007 | Montgomery et al. |
| 7,337,660 | B2 | 3/2008 | Ibrahim et al. |

FOREIGN PATENT DOCUMENTS

| CA | WO 2006/063463 A1 | 6/2006 |
| WO | WO 2006/063463 | 6/2006 |

OTHER PUBLICATIONS

U.S. Appl. No. 12/844,223, "Sensor Mounting System and Method," Lewis J. Dutel and Jeff Hilpert, filed Jul. 27, 2010 (co-pending application with similar subject matter).
Timothy O. Wiemers, "Produced Gas Measurement Using Ultrasonic Metering During Underbalanced Operations," IADC/SPE 108349, Mar. 28, 2007, Galveston, Texas, United States.
PCT Int'l Search Report PCT/US10/38181, Aug. 13, 2010.
PCT Written Opinion PCT/US10/38181, Aug. 13, 2010.

(Continued)

*Primary Examiner* — Gregory J Toatley
*Assistant Examiner* — Amanda Merlino
(74) *Attorney, Agent, or Firm* — Baker & Hostetler LLP (57) ABSTRACT

A flow cell assembly for measuring the flow rate of gas in a pipe having an optical probe mounted on a flow cell inserted between sections of pipe. A distal end of the optical probe is disposed within an internal bore of the flow cell. The optical probe is capable of measuring the velocity of particles in a gas flowing through the internal bore. A sensor mechanism may be mounted on the flow cell and have a sensor array with a distal end disposed within the flow cell internal bore. The sensor array is capable of measuring physical properties of the gas. The optical probe is self-aligned when mounted to the flow cell through the use of a locking cam and an orientation ring. Velocity and physical property measurements are used to calculate flow rate. Alternatively, the optical probe and sensor mechanism may be mounted directly onto an existing pipe.

33 Claims, 7 Drawing Sheets

OTHER PUBLICATIONS

Photon Control, "Focus Probe Optical Gas Flow Meter," Jan. 30, 2009 [online, www.photon-control.com/oil_and_gas/images/pdfs/prodspec-dmk-0007a-e.pdf].

Parker et al, "Flow Metering with Optics fr Blue-Sky Technology to the Real World." 25th Int'l North Sea Flow Measurement Workshop Oct. 16-19, 2007 Abstr; Figs 6, 8, 13; pp. 3, 6-8.

APPARATUS AND METHOD FOR METERING FLARE GAS

CROSS-REFERENCE TO RELATED APPLICATIONS

This application claims the benefit of and priority to U.S. Provisional Patent Application No. 61/186,313, filed Jun. 11, 2009.

FIELD OF THE INVENTION

The present invention relates to an apparatus and method for metering flare gas and more particularly to an apparatus and method for optical metering of flare gas.

BACKGROUND OF THE INVENTION

Hydrocarbon drilling and production rigs often vent or flare gas. Operators and oil companies have increasingly become aware of the environmental impact of such flared gas with respect to $CO_2$ emissions. There is also greater awareness of the economic benefit derived from the monitoring and reduction of emissions. Some countries have even implemented regulations requiring the measurement of flared gas. For these reasons, many operators have opted to measure the volume of flared gas.

Metering systems have been developed to measure flare gas primarily in industrial applications. Conventional systems have proven problematic. Metering system must function in extreme and variable conditions. The systems must be adaptable for large and small diameter pipe. The systems must be able to withstand high flow velocities (in excess of 100 m/s), changing gas composition, pressure differentials, contaminants, $CO_2$, $H_2S$ and water.

Conventional metering systems include insertion turbines, thermal mass meters, annubars, and ultrasonic meters.

Turbine meters contain a rotor positioned in the flow path. The flow of gas causes rotation of the rotor. The gas flow rate is determined by the angular velocity of the rotor. The rotor contains bearings and rotor blades subject to wear by contaminants in the gas. Customary maximum flow range for turbine meters is 30 m/s.

Thermal mass meters normally include two temperature sensors. Situated in the gas flow, one sensor is heated to a predetermined temperature; the other sensing the temperature of the gas. Flow rate is calculated based on the temperature difference between the two sensors (higher flow rates cause increased cooling of the heated sensor). The flow range for thermal meters is 0.3 to 30 m/s.

Annubars detect differential pressures. The signal increases proportional to the square of the gas flow. Annubars are not effective for low flow applications because of the small pressure differentials.

Ultrasonic gas flow meters work on the time-of-flight measurement premise. The meters emit an ultrasonic signal. The transmission time of the signal is measured at increments along a diagonal path in both a downstream and upstream direction. The velocity of the gas causes the time for the signal traveling in the downstream direction to be shorter than the upstream direction. The gas flow rate is calculated from the time differential. The calculation depends on pressure, temperature and other factors. Ultrasound flow meters may require pockets in the pipe walls to contain the ultrasound meters. Contaminants tend to accumulate in the pockets and on the sensors and disrupt the system. Moreover, long sections of pipe can be required for the ultrasonic flowcell. Some ultrasonic systems pass the signal through the wall of the pipe, but the accuracy of these external systems is lessened when operating pressures and flow rates are low.

More recently, optical flow meters have been developed. U.S. Pat. No. 7,265,832 (incorporated herein by reference) describes an optical meter that measures flow velocity of small particles entrained with the gas flow. The system includes a light source, a first optical lens system that generates two beams of light and directs the beams through a first window in the pipe wall to form a pair of focus spots in the volume of pipe at the same location in the pipe cross-section but separated along an axis parallel to the flow direction. The particles entrained in the gas flow that travel along a trajectory coincident with the two focal points, scatter the light in succession and the time delay between scatter occurrences is inversely proportional to the particle velocity. A second window in the pipe wall is opposite the first window. Means collect a portion of the scattered light that pass through the second window. A second optical lens system directs the scattered light to one or more light detector means. An opaque obscuration is positioned to intercept beams at or behind the second window to prevent the unscattered light from reaching the detector. The first optical system, first window, second window, opaque obscuration and second optical system are centered on a common optical axis, perpendicular to the gas flow direction. The two beams of light are directed along the same common optical axis but the focus spots are separated laterally at the focal planes by approximately equal distance from the central axis. A pipe axis is parallel to the gas flow direction. A transverse axis is perpendicular to the optical axis and the pipe axis. Means reduce the beam convergence of the light entering the pipe, in the traverse axis, to widen the focal spots and present a larger scattering cross-section to gas particles traveling in the fluid stream. Means convert the detected light into electrical signals proportional to the incident light intensity. When scattered particles pass through each focal point, a pulse of light is scattered and received by respective detectors. The detectors generate an electrical pulse. Means determine the time delay between electrical pulses. The velocity of the particles is calculated when the distance between the focal points in known. Means determine the flow rate, which is proportional to the particle velocity.

In addition to metering flare gas, ultrasonic metering systems have been employed as part of a well bore and formation evaluation procedure. Critical information (e.g., permeability) may be learned about the formation from the fluids flowing from the formation to the well surface. Data about the amount of gas in the surface flow and the flow rate are used to evaluate the formation. U.S. Pat. No. 6,585,044 (incorporated herein by reference) describes a method and system for well bore and formation evaluation in under-balanced drilling that incorporates the use of an ultrasonic gas flow meter at the well surface.

Despite the advances made in gas flow measurement, the need still exists for an accurate, reliable and cost-efficient flare gas metering system and method adaptable to drilling and production rigs that are capable of generating data operators may use to evaluate formations during drilling and non-drilling applications and to monitor and control emissions for environmental and economic purposes.

SUMMARY OF THE INVENTION

It is an object of the invention to provide a flare gas metering system that is mobile and rugged.

It is an object of the invention to provide a flare gas metering system that may be installed on existing flare pipes.

It is a further object of the invention to provide a flare gas metering system and method that may be used on hydrocarbon drilling and production rigs.

It is a further object of the present invention to provide a flare gas metering system and method that generates data during hydrocarbon drilling operations that may be used to evaluate drilled formations.

It is a further object of the present invention to provide a flare gas metering system and method that generates data during hydrocarbon non-drilling application that may be used to evaluate target formations.

It is a further object of the present invention to provide a flare gas metering system and method that generates data during hydrocarbon drilling operations that calculates the cumulative gas volume per foot drilled from flow rate and time measurements, and captures the cumulative gas volume per foot data with lag time adjustments to create an additional data source for mudlogging and mudlogging reports.

It is a further object of the present invention to provide a flare gas metering system and method that during hydrocarbon drilling and well bore operations measures flare gas emissions to generate carbon foot print data, carbon credit data, and/or emissions taxation data.

These and other objects and advantages are achieved by the novel flare gas metering system and method of the present invention. In one embodiment, the flare gas metering system is a flow cell assembly. The flow cell assembly may have a flow cell, an optical probe, and an optical probe mounting assembly. The flow cell may have an outer surface, an inner surface, an internal bore, a first aperture and a second aperture. The first and second apertures may provide an opening to the internal bore.

The optical probe may be detachably mounted on the outer surface of the flow cell. The optical probe may have a proximal end and a distal end. The optical probe may be disposed through the first aperture of the flow cell so that the distal end of the optical probe is positioned within the internal bore of the flow cell. The optical probe may be capable of measuring the velocity of a gas flowing through the internal bore of the flow cell. A portion of the optical probe may be encased within the optical probe mounting assembly, which may be detachably mounted on the outer surface of the flow cell.

The optical probe may include an opening in the distal end through which the gas flows. The optical probe may also include a means for producing at least two light beams and directing the light beams, separated by a fixed distance, through the opening where the light beams encounter one or more particles in the gas and are scattered thereby. The means for producing at least two light beams and directing the light beams may include a laser light source and a series of lenses. The optical probe may further include a means for collecting the scattered light beams. The means for collecting the scattered light beams may include a second series of lenses and one or more light detectors.

The flow cell assembly may further include a sensor means that is also detachably mounted on the outer surface of the flow cell. The sensor means may include a sensor array, which may have a proximal end and a distal end. The sensor array may be disposed through the second aperture in the flow cell so that the distal end of the sensor array is positioned within the internal bore of the flow cell. The sensor array may be capable of detecting one or more physical properties of the fluid.

The sensor means may include a first sensor and a second sensor. The first sensor may be a temperature sensor detecting a temperature of the gas. The second sensor may be a pressure sensor detecting a pressure of the gas.

The flow cell assembly of this embodiment may also include a control means. The control means may have a control panel, an optical conduit, a first sensor conduit, and a second sensor conduit. The optical conduit may transmit an optical signal generated by the optical probe to the control panel. This optical signal may be indicative of the velocity of the gas in the flow cell. The first sensor conduit may transmit a first signal from the temperature sensor to the control panel. The first signal may be indicative of the temperature of the gas in the flow cell. The second sensor conduit may transmit a second signal from the pressure sensor to the control panel. The second signal may be indicative of the pressure of the gas in the flow cell.

The flow cell may be tubular with a first end having a first flange for detachable connection to a first section of pipe and a second flange for detachable connection to a second section of pipe. The first flange may be detachably connected to the first section of pipe and the second flange may be detachably connected to the second section of pipe to provide fluid communication between the internal bore of the flow cell and the first and second pipe sections.

The optical probe mounting assembly may include a mounting plate and a housing assembly. The mounting plate may be affixed to the outer surface of the flow cell. The mounting plate may have a top surface, a bottom surface, and a bore extending from the top surface to the bottom surface. The bottom surface may be positioned adjacent to the outer surface of the flow cell with the bore aligned with the first aperture of the flow cell to permit passage of the distal end of the optical probe into the internal bore of the flow cell. The housing assembly may be detachably affixed to the mounting plate. The affixation of the housing assembly to the mounting plate may self-align the optical probe and position the distal end of the optical probe within the internal bore of the flow cell at a predetermined depth.

The housing assembly may include a detachable end cap, an orientation ring, a tubular sleeve, a valve orientation holding cell, and a probe socket. The tubular sleeve may have a first end and a second end. The detachable end cap may fit over the first end of the sleeve. The orientation ring may be placed adjacent to the first end of the sleeve to guide insertion of the optical probe. The valve orientation holding cell may include an outer cover, an internal isolation valve, and a back plate. The second end of the sleeve may be operatively connected to the cell. The probe socket may be positioned between the cell and the top surface of the mounting plate. The optical probe may extend through a continuous bore extending through the orientation ring, tubular sleeve, valve orientation holding cell, and probe socket when assembled. The isolation valve may be a ball valve assembly. The outer cover of the valve orientation holding cell may include one or more sealing means, which may be O-rings.

The outer cover of the valve orientation holding cell may include a lateral bore and a locking cam assembly. The locking cam assembly may include a locking cam, a spring locking pin, and a cam pin. The locking cam may have a head with a groove and an elongated portion with a recess and a pin hole extending laterally across the elongated portion. The elongated portion may be positioned within the lateral bore of the cover. The spring locking pin may be positioned within the recess of the elongated portion. The spring locking pin may engage the groove in the head when the head is rotated into an engaged position in which the optical probe is aligned with an axis parallel to the gas flow through the internal bore of the flow cell. The cam pin may be capable of being inserted through the pin hole to secure the locking cam in position within the lateral bore of the cover.

A portion of the sensor means may be encased within a sensor mounting assembly. The sensor mounting assembly may include a sensor mounting plate and a sensor housing assembly. The sensor mounting plate may be affixed to the outer surface of the flow cell. The mounting plate may have a top surface, a bottom surface, and a bore extending from the top surface to the bottom surface. The bottom surface may be positioned adjacent to the outer surface of the flow cell with the bore aligned with the second aperture of the flow cell to permit passage of the distal end of the sensor array into the internal bore of the flow cell. The sensor housing assembly may be detachably affixed to the mounting plate. The affixation of the sensor housing assembly to the mounting plate may position the distal end of the sensor array within the internal bore of the flow cell at a predetermined depth.

The sensor housing assembly may include a sensor cover, a sensor block, and a valve orientation holding cell. The sensor block may have one or more sensor array leads. The valve orientation holding cell may include an outer cover, an internal isolation valve, and a back plate. The sensor block may be contained between the sensor cover and the valve orientation holding cell. The valve orientation holding cell may include an internal bore for insertion of the sensor array. The isolation valve may be a ball valve assembly. The outer cover of the valve orientation holding cell may include one or more sealing means, which may be O-rings.

The outer cover of the valve orientation holding cell may include a lateral bore and a locking cam assembly. The locking cam assembly may include a locking cam, a spring locking pin, and a cam pin. The locking cam may have a head with a groove and an elongated portion with a recess and a pin hole extending laterally across the elongated portion. The elongated portion may be positioned within the lateral bore of the cover. The spring locking pin may be positioned within the recess of the elongated portion. The spring locking pin may engage the groove of the head when the head is rotated into an engaged position in which the sensor array is aligned with an axis parallel to the gas flow through the internal bore of the flow cell. The cam pin may be capable of being inserted through the pin hole to secure the locking cam in position within the lateral bore of the cover.

In another embodiment, the present invention is a method of measuring a flow rate of a gas in a flow line. The method may include providing a flow cell assembly within a gas flow line. The flow cell assembly may include a flow cell, an optical probe, and an optical probe mounting assembly. The flow cell may have an outer surface, an inner surface, an internal bore, a first aperture, and a second aperture. The first and second apertures may provide openings to the internal bore of the flow cell. The optical probe may be detachably mounted on the outer surface of the flow cell. The optical probe may have a proximal end and a distal end. The optical probe may be disposed through the first aperture in the flow cell so that the distal end of the optical probe is positioned within the internal bore of the flow cell. The optical probe may be capable of measuring the velocity of a gas flowing through the internal bore of the flow cell. The optical probe mounting assembly may also be detachably mounted on the outer surface of the flow cell, and may encase a portion of the optical probe. The method may also include obtaining a raw point flow velocity data of the gas flowing in the flow line, and filtering the raw point flow velocity data reject errant velocity data, yielding a filtered raw point flow velocity data. The filtered raw point flow velocity data may be corrected based on an empirical data of flow meter type and operating conditions to obtain a bulk velocity data. A corrected flow rate may be calculated for the gas in the flow line based on the bulk velocity data and an internal diameter of the flow line. The method may further include calculating a gas volume per foot drilled data based on the corrected flow rate for the gas and a time measurement.

In an alternate embodiment, the flow cell assembly may further include a sensor means detachably mounted on the outer surface of the flow cell. The sensor means may include a sensor array having a proximal end and a distal end. The sensor array may be disposed through the second aperture in the flow cell so that the distal end of the sensor array is positioned within the internal bore of the flow cell. The sensor array may include a temperature sensor and a pressure sensor. The method may further include obtaining a temperature measurement of the gas and obtaining a pressure measurement of the gas. The temperature and pressure measurements may be used in the calculation of a corrected flow rate for the gas in the flow line.

The gas flow line may be a flare gas line on a hydrocarbon production or drilling rig. The corrected flow rate may be used to determine an amount of gas flared into the atmosphere. This amount of gas may be used to determine carbon footprint data, carbon credit data, or emission taxation data.

The gas flow line may be in fluid communication with a return flow line of a hydrocarbon well bore. The corrected flow rate may be used to determine an amount of gas in the return flow line, to characterize a hydrocarbon reservoir, to determine a zone flow during managed pressure drilling, to determine a flow volume during under-balanced drilling, to determine a zone bleed off of gas during tight gas fractured formation drilling, to determine an amount of produced gas during mud logging operations, or to determine an amount of produced gas during casing drilling.

DETAILED DESCRIPTION OF THE PREFERRED EMBODIMENTS

Figure 1:
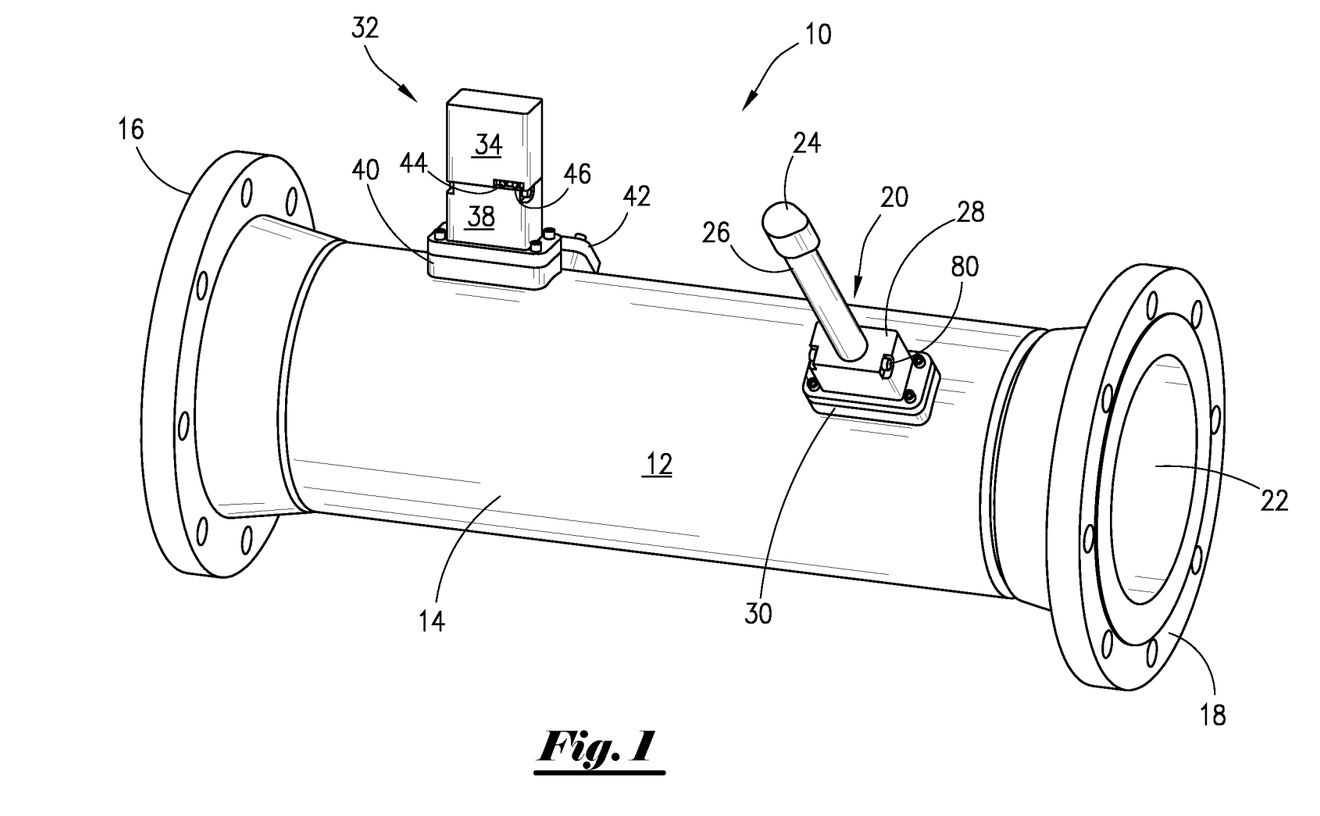
FIG. 1 is a perspective view of the flow cell assembly of the present invention.

With reference to FIG. 1, flow cell assembly 10 includes flow cell 12. Flow cell 12 includes longitudinal portion 14 and flange members 16, 18. Portion 14 has an inner diameter that corresponds with the inner diameter of the flow line to which flow cell 12 is to be attached. It is to be understood that the inner diameter of flow cell 12 may be made in different diameters depending on the inner diameter of the flow line that will receive flow cell 12. Members 16 and 18 are designed to be affixed to respective ends of the flow line preferably by bolted connection with corresponding flanges. When flow cell 12 is connected to the flow line, flow cell 12 is in fluid communication with the flow line.

Again with reference to FIG. 1, flow cell assembly 10 includes optical probe assembly 20. Assembly 20 is detachably affixed to the outer surface of flow cell 12. A bore (not shown) in flow cell 12 permits passage of optical probe 48 (not shown) from outside flow cell 12 to within inner bore 22 of flow cell 12. As shown in FIG. 1, assembly 20 includes probe cap 24, probe sleeve 26, valve orientation holding cell 28, and mounting plate 30. Mounting plate 30 may be mounted onto the outer surface of flow cell 12 by any number of mounting means. For example, mounting plate 30 may be affixed to flow cell 12 by bolts or screws. Valve orientation holding cell 28 is detachably affixed to mounting plate 30 by any suitable mounting means. For example, cell 28 many be detachably affixed to mounting plate 30 by bolts or screws. The distal end of probe sleeve 26 is slidably positioned within valve orientation holding cell 28. Probe cap 24 may be detachably positioned on the proximal end of probe sleeve 26 when assembly 20 is non-operational.

FIG. 1 also shows pressure/temperature assembly 32. Assembly 10 may function without assembly 32. Assembly 32 may be detachably affixed to the outer surface of flow cell 12. A second bore (not shown) in flow cell 12 permits the passage of temperature and pressure sensors into bore 22 of flow cell 12. Assembly 32 includes PT housing cover 34, PT block 36 (although not shown, a temperature/pressure sensor array attaches to PT block 36), second valve orientation holding cell 38 and mounting block 40. PT block 36 includes temperature lead 44 and pressure lead 46. PT block could contain a combined temperature/pressure lead. Mounting plate 40 may be mounted onto the outer surface of flow cell 12 by any number of mounting means. For example, mounting plate 40 may be affixed to flow cell 12 by bolts or screws. Second valve orientation holding cell 38 is detachably affixed to mounting plate 40 by any suitable mounting means. For example, cell 38 may be detachably affixed to mounting plate 40 by bolts or screws. Mounting plates 30 and 40 may be identical components. Cells 28 and 38 may also be identical components.

Mounting plates 30, 40 have radii based on pipe size. Any number of mounting plates 30 and 40 may be detachably secured to flow cell 12. For example, two mounting plates 30 and two mounting plates 40 may be detachably fixed to flow cell 12. One set of mounting plates 30, 40 may be positioned on one side of flow cell 12 and the other set of mounting plates 30, 40 may be positioned on the opposite side of flow cell 12. By including multiple mounting plates 30, 40, probe assembly 20 and pressure/temperature assembly 32 may be secured to respective mounting plates 30, 40 in different spatial positions on flow cell 12. This is desirable because the positioning of flow cell 12 in the flow line could result in an obstruction that would prevent the detachable fixation of assemblies 20, 32 on one of mounting plates 30, 40 but not on the other set of mounting plates 30, 40 which are situated on the opposite side of flow cell 12.

When probe assembly 20 is not detachably affixed to mounting plate 30, blank cover 42 may be detachably affixed to mounting plate 30. Cover 42 may be detachably affixed to mounting plate 30 by any suitable means. For example, cover 42 could be detachably secured to mounting plate by bolts or screws. When probe assembly 32 is not detachably affixed to mounting plate 40, blank cover 42 may be detachably affixed to mounting plate 40. Cover 42 may be detachably affixed to mounting plate 40 by any suitable means. For example, cover 42 could be detachably secured to mounting plate by bolts or screws. When secured to mounting plates 30, 40, cover 42 acts to prevent the passage of fluid such as flare gas from escaping through the bores in flow cell 12 to the atmosphere.

Figure 2:
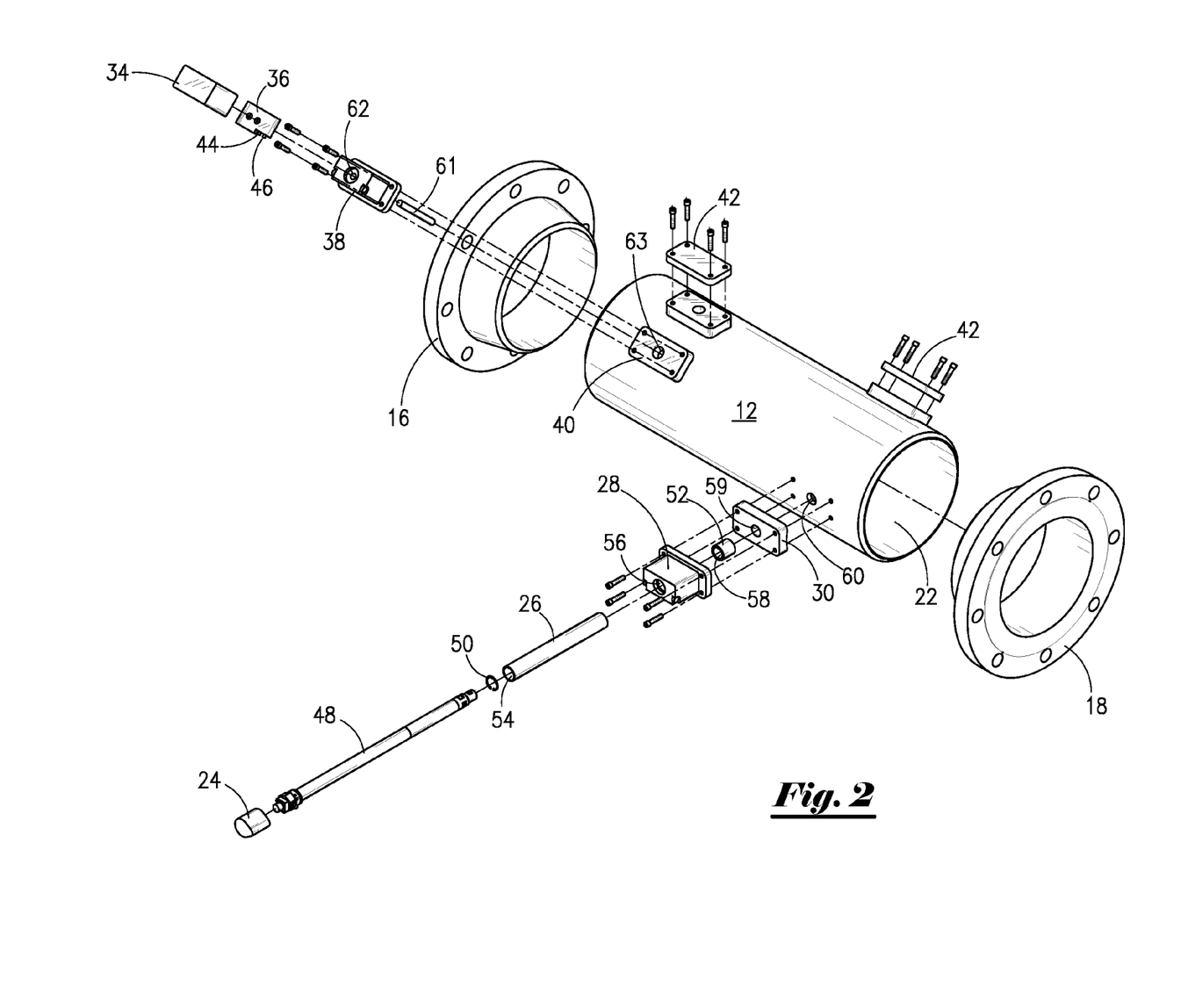
FIG. 2 is an exploded perspective view of the flow cell assembly of the present invention.

With reference to FIG. 2, optical probe assembly 20 further includes optical probe 48, orientation ring 50 and probe socket 52. Probe 48 is designed to be inserted through ring 50, through inner bore 54 of sleeve 26, through inner bore 56 of cell 28, through inner bore 58 of socket 52, through inner bore 59 of mounting plate 30 and through bore 60 in flow cell 12. The distal end of probe 48 sets within inner bore 22 of flow cell 12 at a predetermined position, e.g., ¼" radius. Sensor array 61 is designed to be inserted through inner bore 62 of cell 38, through inner bore 63 of mounting block 40 and through bore (not shown) in flow cell 12. The distal end of sensor array 61 sets within inner bore 22 of flow cell 12 at a predetermined position.

Figure 3:
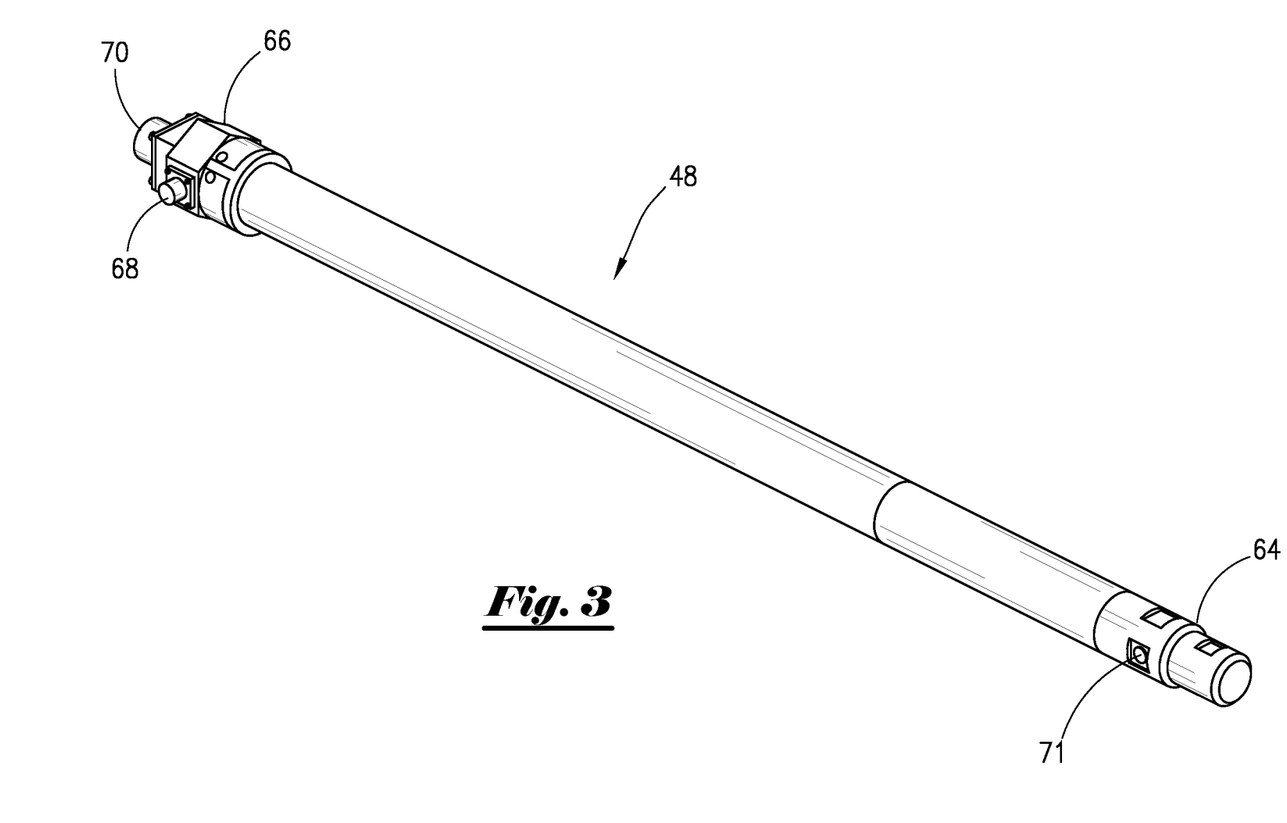
FIG. 3 is a perspective view of the optical probe of the flow cell assembly of the present invention.

FIG. 3 illustrates an embodiment of optical probe 48. Probe 48 contains distal end 64 and proximal end 66. Distal end 64 is designed to be positioned within inner bore 22 of flow cell 12. Proximal end 66 includes heat lead 68 and fiber optic lead 70. Probe 48 may also include opening 71 through which gas may flow for measuring particle velocity. Probe 48 may be any type of optical probe capable of measuring particle velocity. Probe 48 may have the following specifications:

(1) Process temperature −40° C. to +100° C.;
(2) Maximum pressure 150 psig;
(3) Probe dimensions—diameter ¾" and length 27";
(4) Pipe size—4" to 24";
(5) Measurements range—0.1 m/s to 150 m/s;
(6) Measurement accuracy—
5% (0.1 m/s-1 m/s)
2.5% (1 m/s-100 m/s)
5% (100 m/s-150 m/s).

Probe 48 may function based on "laser-two-focus" particulate velocimetry. Probe 48 may include laser light sources capable of producing two light beams separated by a fixed distance. Probe 48 may also include a lens system for directing the light beams across opening 71 (shown in FIG. 3). The light may be concentrated in two active sheets of light within opening 71. The active sheets may be perpendicular to the flow direction and separated by a fixed distance. Light is scattered when a particle in the gas flowing through inner bore 22 intersects each active sheet. Probe 48 may further include a second lens system and one or more light detectors. The second lens system may direct the scattered light to one or more of the light detectors. The second lens system may include a mirror for reflecting scattered light in a specified direction. In this way, probe 48 detects particles flowing in the gas. By measuring the time delay between light scattering occurrences in each active sheet, probe 48 may detect the velocity of the gas. Alternatively, probe 48 may function based on "laser-two-beam" particulate velocimetry, in which probe 48 may use light beams to measure the velocity of gas particles by sensing the scintillation of the light beams caused by flow turbulence.

Figure 7:
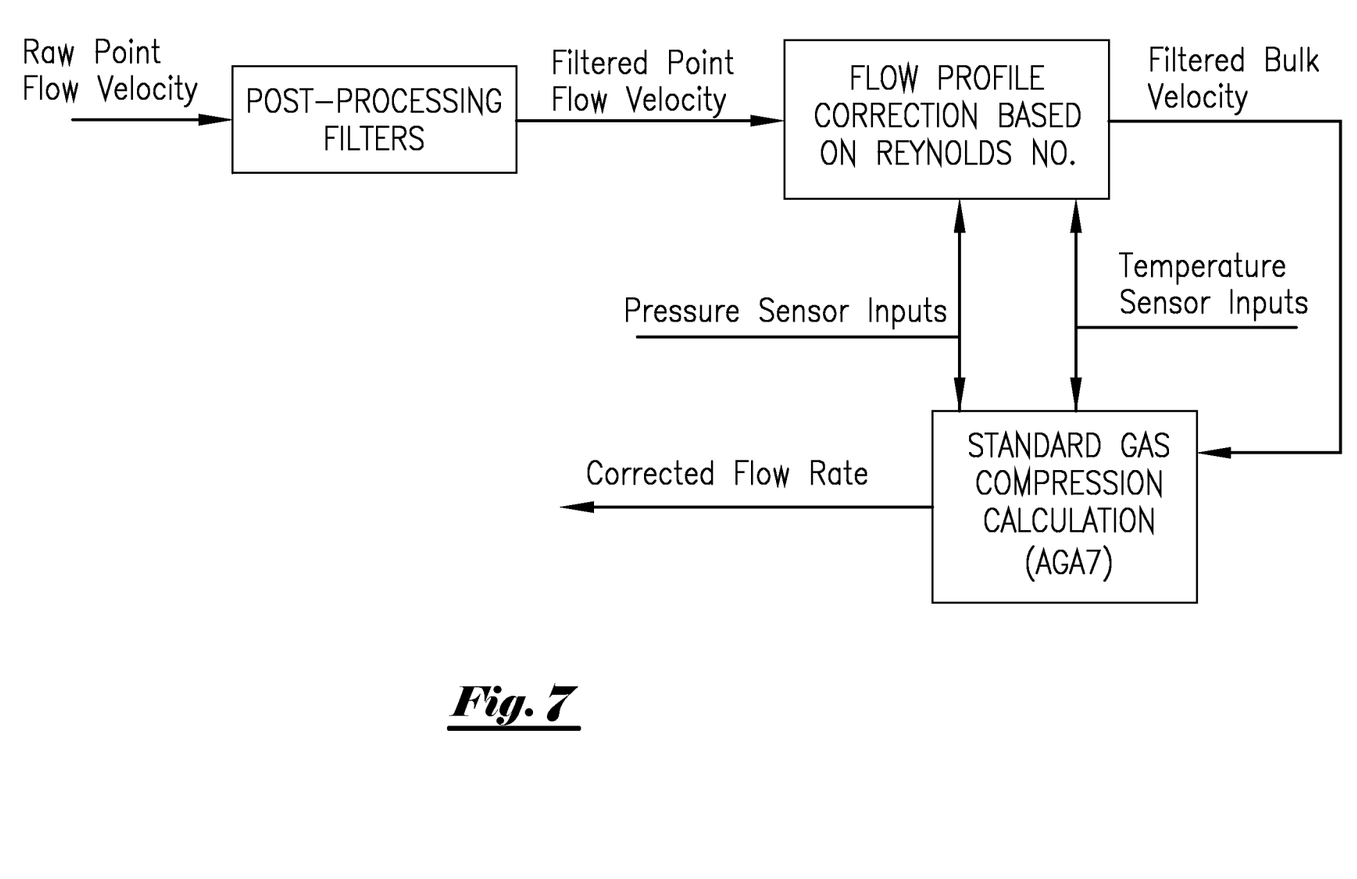
FIG. 7 is a block diagram of the method of calculating a flow rate from raw point velocity values.

Correlation calculation is time based and not affected by optical signal amplitude. No field re-calibration is necessary. Flow rate is calculated in three stages: (1) post processing filters are used to reject errant samples; (2) flow profile correction based on empirical characterizations for each flow meter type and operating condition using Reynolds number correction; and (3) flow rate is calculated for standard conditions using AGA7/AGA8, as illustrated in FIG. 7. Probe 48 is commercially available from Photon Control, Inc. under model name FOCUS Probe Optical gas Flow Meter (L2F) and under the model name Laser-Two-Beam Optical Gas Flow Meter (L2B).

Referring again to FIG. 7, the velocity values detected by probe 48 may be referred to as the raw point flow velocity values in one embodiment. These values may be filtered to reject errant velocity values resulting in filtered point flow velocity data. This filtered raw point flow velocity data may then be corrected for flow profiles based on Reynolds number, or other empirical data of the flow profile. The corrected data may be referred to as the bulk velocity data. From the bulk velocity data, a corrected flow rate for the gas may be calculated based on the internal diameter of longitudinal portion 14, and the temperature and pressure measurements taken by sensor array 61. The temperature and pressure measurements may also be used to calculate the Reynolds number.

The use and operation of an optical probe 48 is described in International Patent Application Publication No. WO 2006/063463 and in Canadian Published Patent Application CA 2 490 532 A1, which are each incorporated herein by reference.

Figure 4:
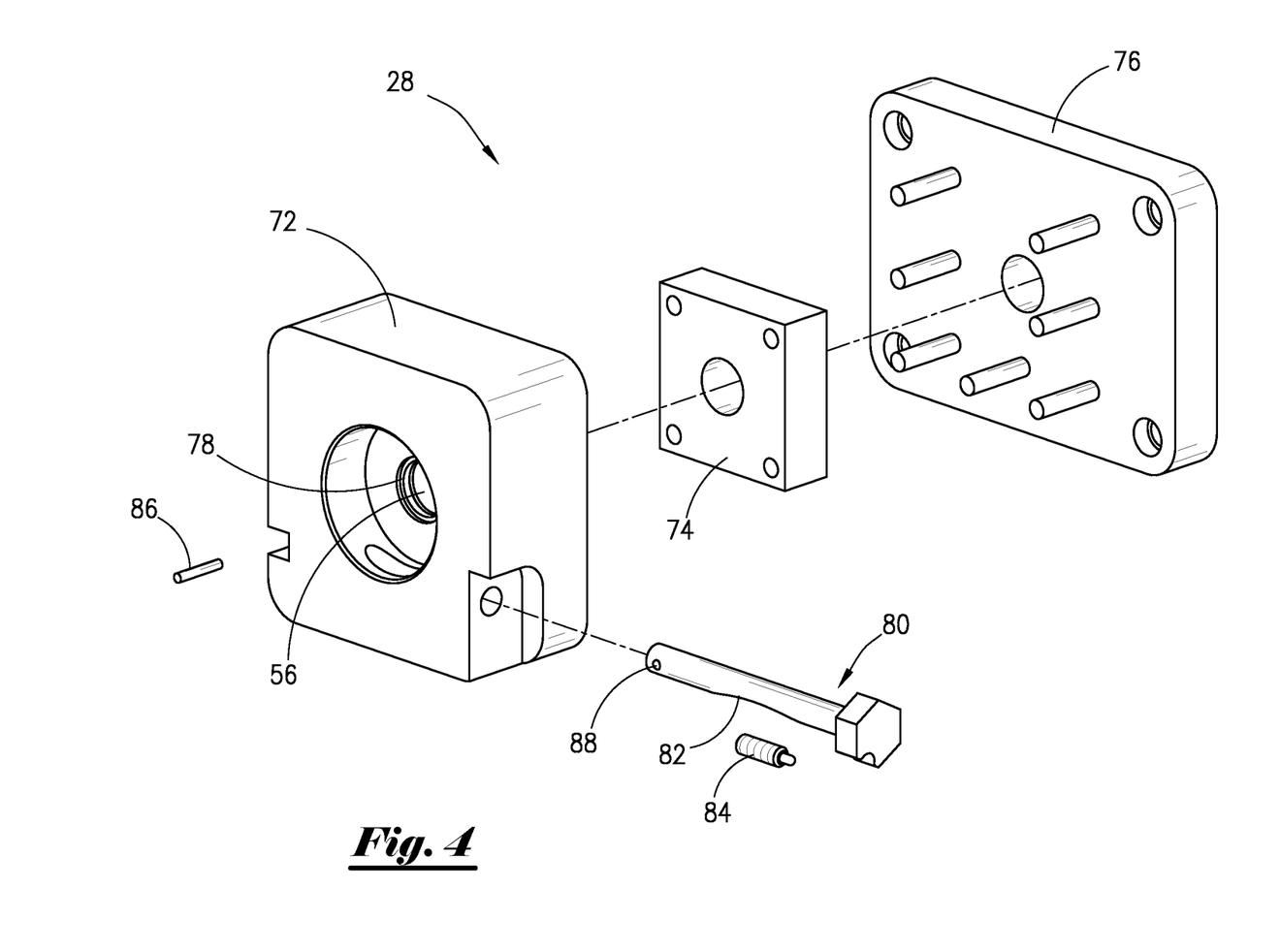
FIG. 4 is an exploded perspective view of the valve orientation holding cell component and locking cam assembly of the present invention.

As seen in FIG. 4, valve orientation holding cell 28 (and cell 38) includes cover 72, internal isolation valve 74, and back plate 76. Cover 72 includes one or more O-rings 78 positioned around bore 56. When probe 48 is inserted in probe assembly 20, probe 48 is run past O-rings 78 to isolation valve 74 (e.g., a ball valve assembly). Valve 74 has previously been actuated and has sealed flow cell 12. O-rings 78 form a seal around probe 48. Valve 74 is deactivated and no longer seals the passage to flow cell 12. Probe 48 may then be inserted further to a predetermined point where a portion of distal end 64 of probe 48 sets within bore 22 of flow cell 12. O-rings 78 provide a seal preventing gas within flow cell 12 from escaping to the atmosphere. When removing probe 48, probe 48 is pulled out of flow cell 12 to a predetermined position where valve 74 can be actuated while O-rings 78 continue to provide a seal around probe 48. After valve 74 is actuated, probe 48 may be removed from probe assembly 20.

As seen in FIG. 4, valve orientation holding cell 28 (and cell 38) includes locking cam 80, which is insertable through a bore in cover 72. Cam 80 contains recess 82. Recess 82 houses spring locking pin 84. Cam pin 86 may be inserted through cam pin hole 88 in locking cam 80. Locking cam 80 locks probe 48 or sensor array of PT Block 36 into a fixed position and orientation. The mechanism consists of a round plug with an orientating groove machined into that fits into a matching socket. When the plug is orientated correctly, a cam shaft is able to rotate into the plug groove providing for fixed position and orientation. This cam shaft is manually rotated by a hex head. This hex head is notched in such a manner that when the cam shaft is fully engaged, the notch becomes engaged with a spring loaded locking pin. The pin locks the cam shaft assembly in the engaged position so that it can not become disengaged unless released by the user pushing the locking pin back into a neutral position thus allowing the hex head to rotate the cam shaft freely back into the unlocked position.

Figure 5:
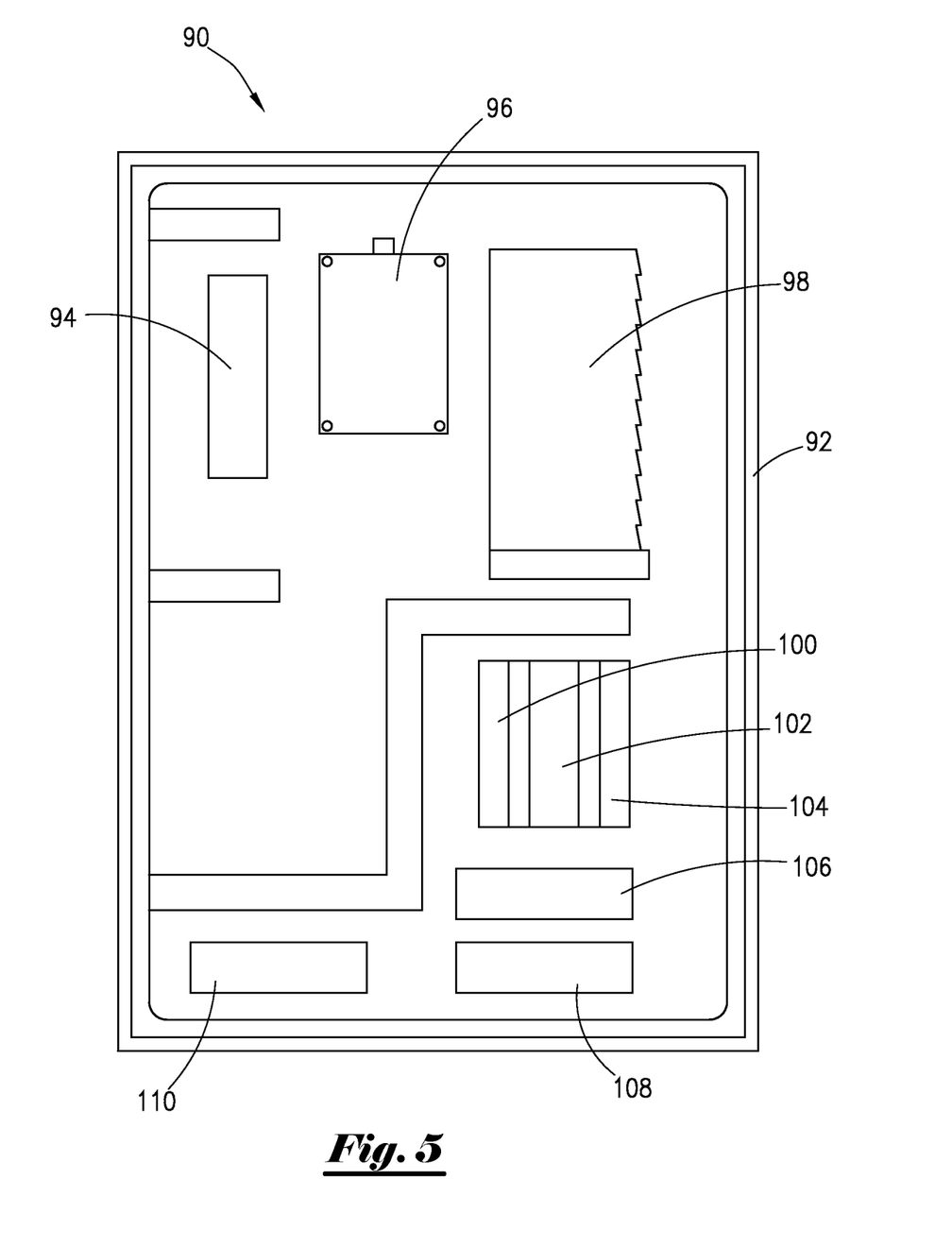
FIG. 5 is a schematic of the components of the control panel assembly of the present invention.

FIG. 5 shows control assembly 90. Assembly 90 includes control panel 92. Panel 92 includes power supply 94, wireless transmitter 96, flow computer 98, heater barrier 100, temperature barrier 102, pressure barrier 104, intrinsically safe power supply 106, intrinsically safe terminals 108, and other terminals, power, 4-20 output and other devices 110.

Computer 98 may be wirelessly accessible so that control over the flow cell assembly may be accomplished remotely. Data generated from measuring the gas passing through flow cell 12 may also be wirelessly transmitted to a remote location or computer for further processing and analysis. Computer 98 may have the following specifications:

(1) RS-485
  (a) Format 8N1
  (b) Modbus RTU
  (c) 2400, 9600, and 38,400

Figure 6:
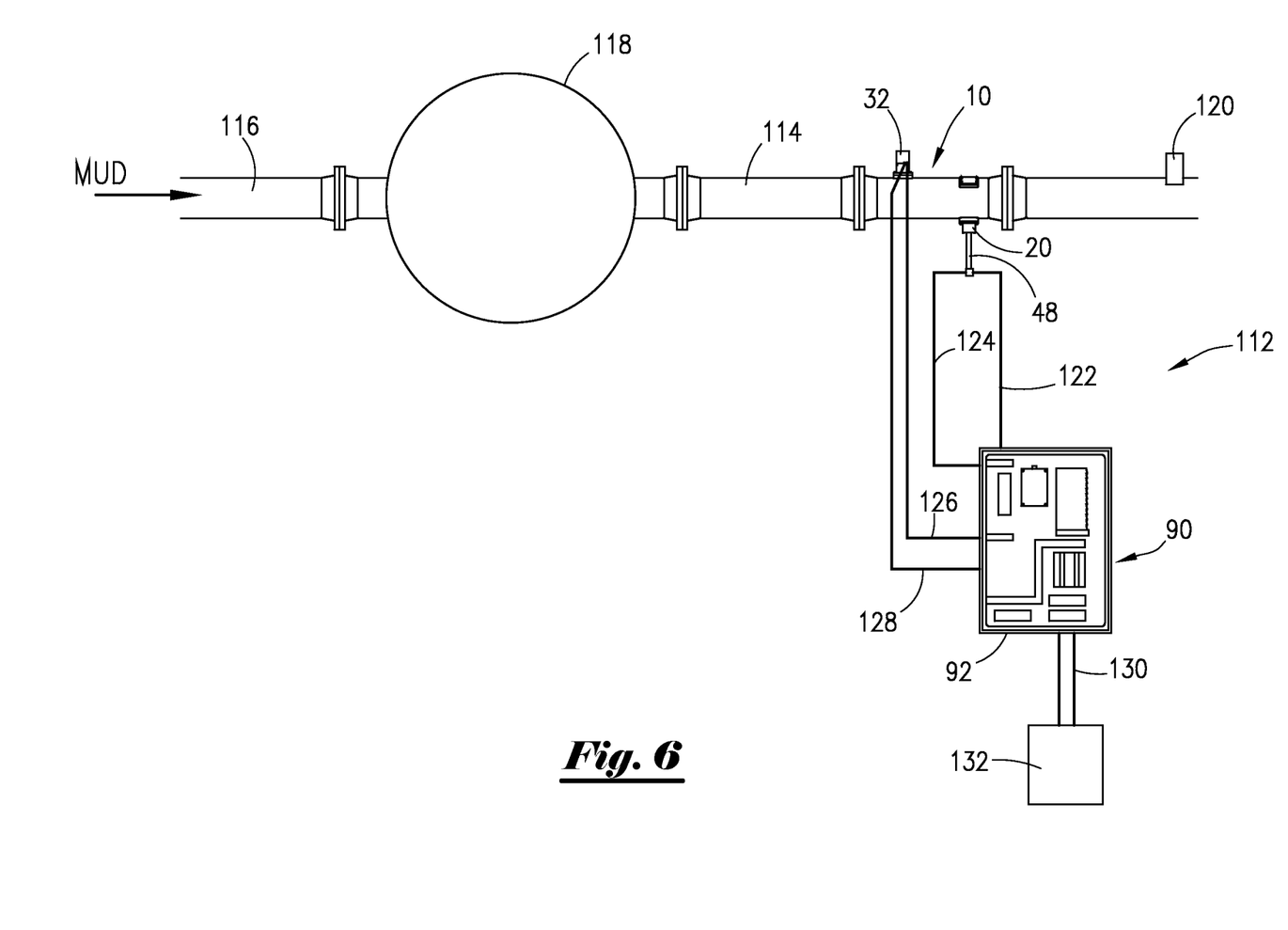
FIG. 6 is a schematic of the flare gas metering system of the present invention.

(2) RS-232
  (a) Format 8N1
  (b) Proprietary protocal
  (c) 38,400 only
(3) 4-20 ma analog
(4) Probe alarm As illustrated in FIG. 6, flare gas metering system 112 includes flow cell assembly 10 and control assembly 90. System 112 is incorporated into flare line 114, which is part of an oil and gas drilling rig flare assembly. Drilling mud return line 116 carries back fluids from the well and deposits them in separator 118. The fluids contain liquids and gases (some of which are flammable). The liquids exit the bottom of the separator and the gases exit the top through flare line 114. Flare line 114 has an ignition source 120 positioned at the end of the line which ignites the flammable gas exiting line 114. Flow cell assembly 10 has been positioned in fluid communication with the gas passing through line 114. Probe assembly 20, and in particular probe 48, is operatively connected to control assembly 90 via optical conduit 122 and heat conduit 124. Pressure/temperature assembly 32, and in particular PT block 36, is operatively connected to control assembly 90 via temperature conduit 126 and pressure conduit 128. Control assembly 90, namely control panel 92, is operatively connected via power line 130 to power source 132. Power source 132 can be any type of power source supplying power (e.g., electrical) to control assembly 90 and flow cell assembly 10. Power source 132 could be an electrical generator.

It is to be understood that flow cell 12 need not be used as part of the system 112. Probe assembly 20 and pressure/temperature assembly 32 (or probe assembly 20 alone) are capable of being directly connected to flare line 114. A magnetic jig may be used to determine the placement of mounting plates 30, 40 on line 114. Using the jig, holes may be drilled for securing mounting plates 30, 40 to line 114. The jig will also position the placement of the bores though line 114 that will accommodate probe 48 and the sensor(s) of PT block 36. Probe assembly 20 and pressure/temperature assembly 32 may be affixed to line 114 as described hereinabove.

Once mounting plates 30, 40 are affixed to flow cell 12 or line 114, the assembly and positioning of probe assembly 20 and pressure/temperature assembly 32 is straightforward and easily undertaken. With the attachment of valve orientation holding cell 28 and fixation of orientation ring 50 and probe sleeve 26, probe 48 is self-aligning. Probe 48 may be inserted into flow cell 12 or line 114, removed, and reinserted without having to readjust or realign any of the components. Moreover, the depth of insertion of probe 48 within flow cell 12 or line 114 is predetermined. The same is true for assembly 32. When cell 38 is fixed to mounting plate 40, PT block 36 with its extended sensor array is self-aligning. The sensor array may be inserted into flow cell 12 or line 114, removed, and reinserted without having to realign or readjust any of the components.

Optical probe 48 collects light intensity data each time a particle scatters the light in each of the two sheets within inner bore 22 (or flare line 114). Optical probe 48 transmits the light intensity data through optical conduit 122 to control panel 92. Pressure/temperature assembly 32 measures the temperature and pressure of the fluid within flare line 114. Pressure/temperature assembly 32 transmits the temperature and pressure measurements through temperature conduit 126 and pressure conduit 128 to control panel 92. Computer 92 calculates the raw velocity of the particles based on the time between light scattering occurrences. Computer 92 filters the raw velocity values and rejects outlier values. Pressure and temperature values and flow profile information are used to calculate the flow rate of the gas in flare line 114. If pressure/temperature assembly 32 is not included, computer 92 may use a predetermined fixed pressure value and temperature value in calculations.

System 112 may be used in a number of processes. For example, system 112 may be used to measure gas flow from the well through line 114 during drilling operations (e.g., managed pressure drilling, underbalanced drilling, casing drilling, conventional drilling). The flow rate measurements obtained may be used to generate data (e.g., permeability data, zone data, flow volumes, volume of fluids in reservoirs, reservoir characterization, gas volume per foot drilled) for evaluation of the drilled formations. The flow rate and pressure measurements may be used to determine the reservoir pressure of the formation or a specific portion of the formation or layer of interest. With these measurements, Darcy's Radial Flow equation may be used to solve for matrix permeability or fracture transmissibility. Computer models may be used to project well production and reservoir estimates.

Also, the flow rate measurements may be used with time measurements to calculate a running cumulative volume of gas per foot drilled. As the well is drilled, the cumulative volume can be divided over the time necessary to drill each foot. This footage value may be applied to the depth by the lag time required to transfer the gas to the surface location of the meter. This date may be plotted on a mudlogging report as a new data set that enhances all other data recorded for that footage value and that depth. This cumulative volume of gas per foot drilled may also be calculated when time is a variable.

System 112 may also be used to measure gas flow from a well bore through line 114 during non-drilling operations (e.g., gas lift or fracturing operations). System 112 may also be used to measure gas flow through line 114 during drilling and well bore operations in order to measure gas emissions to produce carbon footprint data, carbon credit data, or emissions taxation data.

Processes for evaluating formations are described in the following U.S. patents, which are each incorporated herein by reference:

(1) U.S. Pat. No. 6,585,044;
(2) U.S. Pat. No. 6,401,538;
(3) U.S. Pat. No. 6,817,229;
(4) U.S. Pat. No. 6,938,458;
(5) U.S. Pat. No. 6,829,947; and
(6) U.S. Pat. No. 7,337,660.

While preferred embodiments of the present invention have been described, it is to be understood that the embodiments are illustrative only and that the scope of the invention is to be defined solely by the appended claims when accorded a full range of equivalents, many variations and modifications naturally occurring to those skilled in the art from a review hereof.

What is claimed is:

1. A flow cell assembly comprising:
a flow cell having an outer surface, an inner surface, and an internal bore, said flow cell including a first aperture and a second aperture, each of said first and second apertures providing an opening to said internal bore;
an optical probe detachably mounted on said outer surface of said flow cell, said optical probe having a proximal end and a distal end, said optical probe being disposed through said first aperture in said flow cell so that said distal end of said optical probe is positioned within said internal bore of said flow cell, said optical probe capable of measuring the velocity of a gas flowing through said internal bore of said flow cell;
sensor means detachably mounted on said outer surface of said flow cell, said sensor means including a sensor array having a proximal end and a distal end, said sensor array being disposed through said second aperture in said flow cell so that said distal end of said sensor array is positioned within said internal bore of said flow cell, said sensor array capable of detecting one or more physical property of said gas; and
an optical probe mounting assembly detachably mounted on said outer surface of said flow cell, a portion of said optical probe encased within said optical probe mounting assembly.

2. The flow cell assembly according to claim 1, wherein said optical probe includes: an opening in said distal end through which said gas flows; a means for producing at least two light beams and directing said light beams, separated by a fixed distance, through said opening where said light beams encounter one or more particles in said gas and are scattered thereby; and a means for collecting said scattered light beams.

3. The flow cell assembly according to claim 2, wherein said means for producing at least two light beams and directing said light beams includes a laser light source and a series of lenses.

4. The flow cell assembly according to claim 3, wherein said means for collecting said scattered light beams include a second series of lenses and one or more light detectors.

5. The flow cell assembly according to claim 1, wherein said sensor means includes a first sensor and a second sensor.

6. The flow cell assembly according to claim 5, wherein said first sensor is a temperature sensor detecting a temperature of said gas and said second sensor is a pressure sensor detecting a pressure of said gas.

7. The flow cell assembly according to claim 6, further comprising: a control means including a control panel, an optical conduit, a first sensor conduit, and a second sensor conduit, said optical conduit transmitting an optical signal generated by said optical probe to said control panel, said optical signal indicative of the velocity of said gas in said flow cell, said first sensor conduit transmitting a first signal from said temperature sensor to said control panel, said first signal indicative of said temperature of said gas in said flow cell, said second sensor conduit transmitting a second signal from said pressure sensor to said control panel, said second signal indicative of said pressure of said gas in said flow cell.

8. The flow cell assembly according to claim 1, wherein said flow cell is tubular with a first end including a first flange for detachable connection to a first section of pipe and a second end including a second flange for detachable connection to a second section of pipe.

9. The flow cell assembly according to claim 8, wherein said first flange is detachably connected to said first section of pipe and said second flange is detachably connected to said second section of pipe so that said internal bore of said flow cell is in fluid communication with said first and second pipe sections.

10. The flow cell assembly according to claim 1, wherein said optical probe mounting assembly comprises: a mounting plate affixed to said outer surface of said flow cell, said mounting plate having a top surface, a bottom surface, and a bore extending from said top surface to said bottom surface, said bottom surface positioned adjacent said outer surface of said flow cell with said bore aligned with said first aperture of said flow cell to permit passage of said distal end of said optical probe into said internal bore of said flow cell; and a housing assembly detachably affixed to said mounting plate; wherein said affixation of said housing assembly to said mounting plate self-aligns said optical probe and positions said distal end of said optical probe within said internal bore of said flow cell at a predetermined depth.

11. The flow cell assembly according to claim 10, wherein said housing assembly comprises: a detachable end cap; an orientation ring; a tubular sleeve having a first end and a second end; said detachable end cap fitting over said first end of said sleeve, said orientation ring placed adjacent said first end of said sleeve to guide insertion of said optical probe; a valve orientation holding cell, said cell including an outer cover, an internal isolation valve, and a back plate, said second end of said sleeve operatively connected to said cell; and a probe socket, said socket positioned between said cell and said top surface of said mounting plate; wherein said optical probe extends through a continuous bore extending through said orientation ring, tubular sleeve, valve orientation holding cell, and probe socket when assembled.

12. The flow cell assembly according to claim 11, wherein said isolation valve is a ball valve assembly.

13. The flow cell assembly according to claim 11, wherein said outer cover of said cell includes one or more sealing means.

14. The flow cell assembly according to claim 13, wherein said one or more sealing means are O-rings.

15. The flow cell assembly according to claim 11, wherein said outer cover of said cell includes a lateral bore and a locking cam assembly, said locking cam assembly including: a locking cam having a head with a groove and an elongated portion with a recess and a pin hole extending laterally through said elongated portion, said elongated portion positioned within said lateral bore of said cover; a spring locking pin positioned within said recess of said elongated portion, said spring locking pin engaging said groove in said head when said head is rotated into an engaged position in which said optical probe is aligned with an axis parallel to the gas flow through said internal bore of said flow cell; and a cam pin capable of being inserted through said pin hole to secure said locking cam in position within said lateral bore of said cover.

16. The flow cell assembly according to claim 1, wherein a portion of said sensor means is encased within a sensor mounting assembly, said sensor mounting assembly comprising: a sensor mounting plate affixed to said outer surface of said flow cell, said mounting plate having a top surface, a bottom surface, and a bore extending from said top surface to said bottom surface, said bottom surface positioned adjacent said outer surface of said flow cell with said bore aligned with said second aperture of said flow cell to permit passage of said distal end of said sensor array into said internal bore of said flow cell; and a sensor housing assembly detachably affixed to said mounting plate; wherein said affixation of said housing assembly to said mounting plate positions said distal end of said sensor array within said internal bore of said flow cell at a predetermined depth.

17. The flow cell assembly according to claim 16, wherein said sensor housing assembly comprises: a sensor cover; a sensor block having one or more sensor array leads; a valve orientation holding cell, said cell including an outer cover, an internal isolation valve, and a back plate, said sensor block being contained between said sensor cover and said cell, said cell including an internal bore for insertion of said sensor array.

18. The flow cell assembly according to claim 17, wherein said isolation valve is a ball valve assembly.

19. The flow cell assembly according to claim 17, wherein said outer cover of said cell includes one or more sealing means.

20. The flow cell assembly according to claim 19, wherein said one or more sealing means are O-rings.

21. The flow cell assembly according to claim 17, wherein said outer cover of said cell further includes a lateral bore and a locking cam assembly, said locking cam assembly including: a locking cam having a head with a groove and an elongated portion with a recess and a pin hole extending laterally through said elongated portion, said elongated portion positioned within said lateral bore of said cover; a spring locking pin positioned within said recess of said elongated portion, said spring locking pin engaging said groove in said head when said head is rotated into an engaged position in which said sensor array is aligned with an axis parallel to the gas flow through said internal bore of said flow cell; and a cam pin capable of being inserted through said pin hole to secure said locking cam in position within said lateral bore of said cover.

22. A method of measuring a flow rate of a gas in a flow line comprising the steps of: a) providing a flow cell assembly within a gas flow line, said assembly comprising: a flow cell having an outer surface, an inner surface, and an internal bore, said flow cell including a first aperture and a second aperture, each of said first and second apertures providing an opening to said internal bore; an optical probe detachably mounted on said outer surface of said flow cell, said optical probe having a proximal end and a distal end, said optical probe being disposed through said first aperture in said flow cell so that said distal end of said optical probe is positioned within said internal bore of said flow cell, said optical probe capable of measuring the velocity of a gas flowing through said internal bore of said flow cell; and an optical probe mounting assembly detachably mounted on said outer surface of said flow cell, said optical probe mounting assembly encasing a portion of said optical probe; b) obtaining a raw point flow velocity data of the gas flowing in said flow line; c) filtering said raw point flow velocity data to reject errant velocity data to obtain filtered raw point flow velocity data; d) correcting said filtered raw point flow velocity data based on an empirical data of flow meter type and operating conditions to obtain a bulk velocity data; e) calculating a corrected flow rate for said gas in said flow line based on said bulk velocity data and an internal diameter of said flow line,
wherein said flow cell assembly further comprises: sensor means detachably mounted on said outer surface of said flow cell, said sensor means including a sensor array having a proximal end and a distal end, said sensor array being disposed through said second aperture in said flow cell so that said distal end of said sensor array is positioned within said internal bore of said flow cell, said sensor array including a temperature sensor and a pressure sensor, and wherein said method further comprises the steps of: b1) obtaining a temperature measurement of said gas in said flow line; b2) obtaining a pressure measurement of said gas in said flow line; and e1) using said temperature measurement and said pressure measurement for calculating said corrected flow rate for said gas in said flow line.

23. The method according to claim 22, further comprising the step of: f) calculating a gas volume per foot drilled data based on said corrected flow rate for said gas and a time measurement.

24. The method according to claim 22, wherein said gas flow line is a flare gas line on a hydrocarbon production or drilling rig, and wherein said corrected flow rate is used to determine an amount of gas flared into the atmosphere.

25. The method according to claim 22, where said amount of gas flared into the atmosphere is used to determine carbon footprint data, carbon credit data, or emission taxation data.

26. The method according to claim 22, wherein said gas flow line is in fluid communication with a return flow line of a hydrocarbon well bore.

27. The method according to claim 26, wherein said corrected flow rate is used to determine an amount of gas in said return flow line.

28. The method according to claim 26, said corrected flow rate is used to characterize a hydrocarbon reservoir.

29. The method according to claim 26, wherein said corrected flow rate is used to determine a zone flow during managed pressure drilling.

30. The method according to claim 26, wherein said corrected flow rate is used to determine a flow volume during under-balanced drilling.

31. The method according to claim 26, wherein said corrected flow rate is used to determine a zone bleed off of gas during tight gas fractured formation drilling.

32. The method according to claim 26, wherein said corrected flow rate is used to determine an amount of produced gas during mud logging operations.

33. The method according to claim 26, wherein said corrected flow rate is used to determine an amount of produced gas during casing drilling.

\* \* \* \* \*